UNITED STATES PATENT OFFICE.

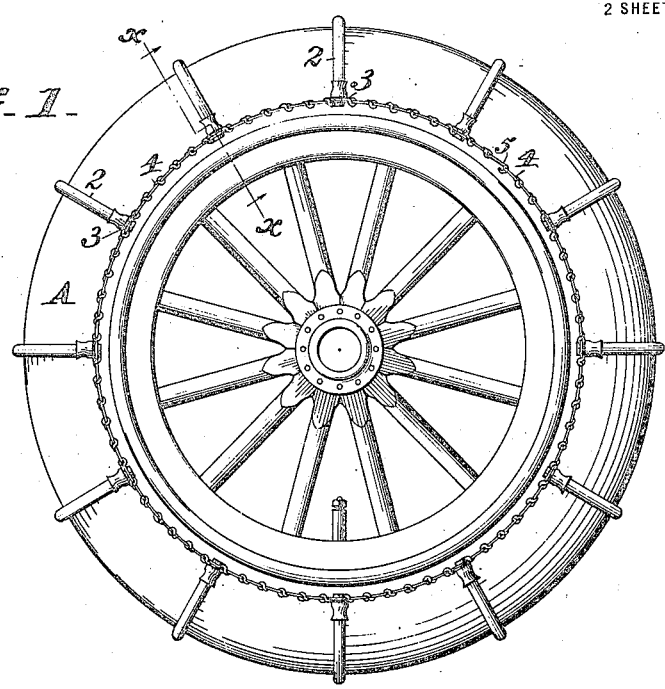
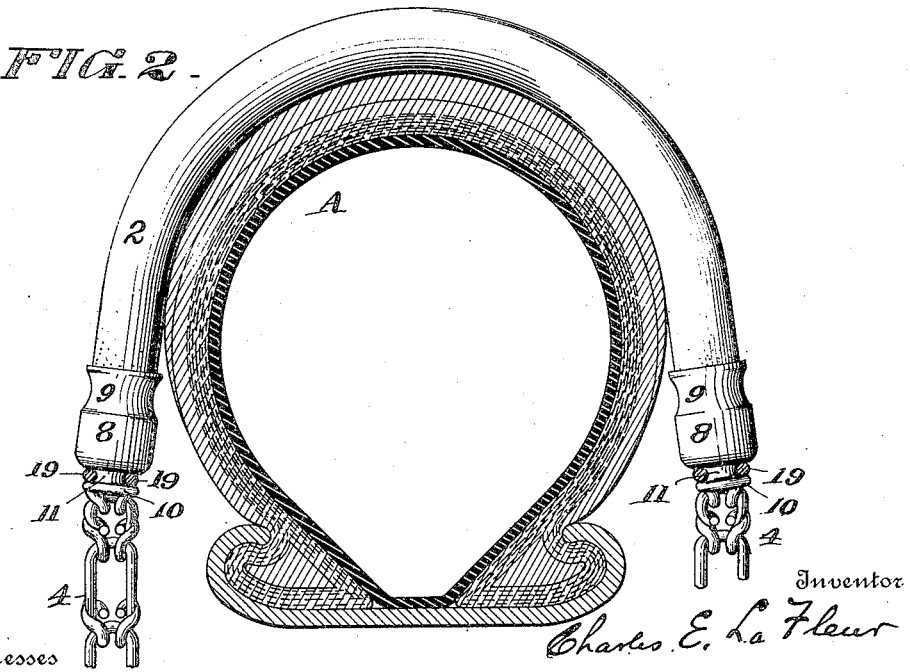

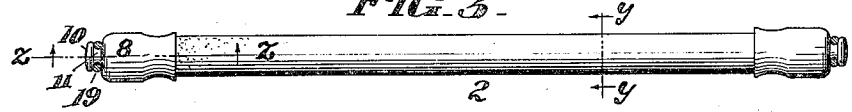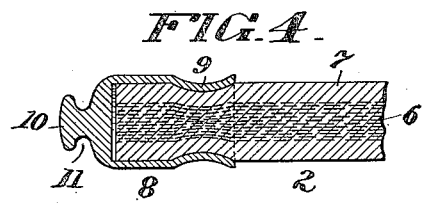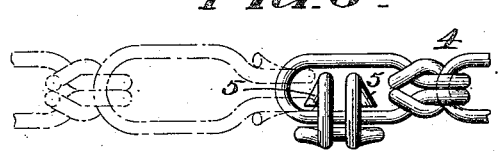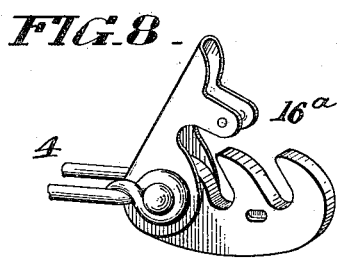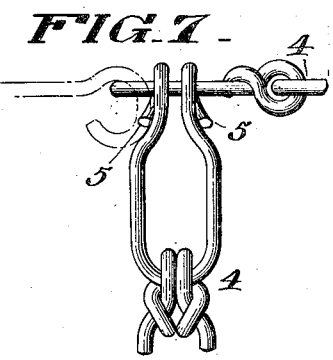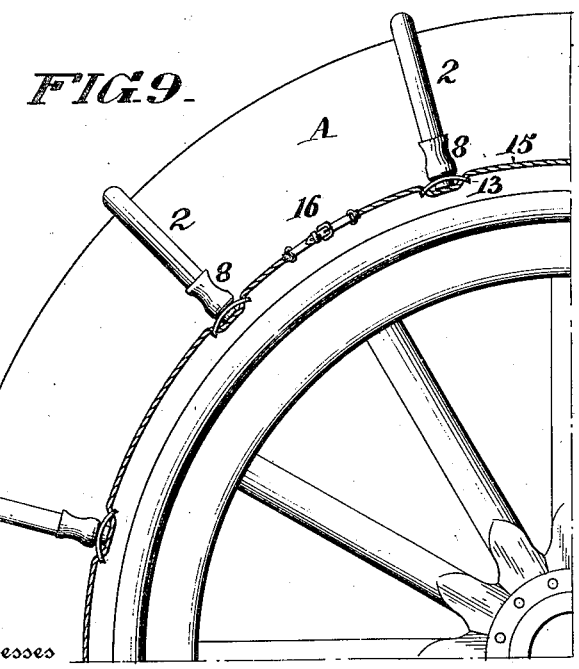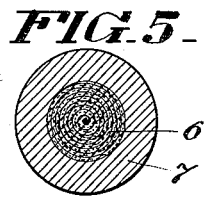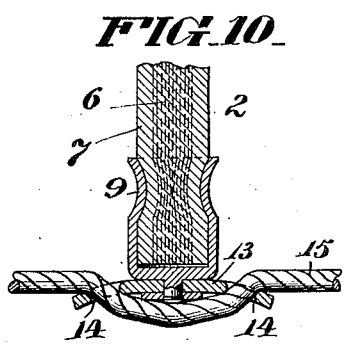

CHARLES E. LA FLEUR, OF PHILADELPHIA, PENNSYLVANIA.

TRACTION DEVICE FOR PNEUMATIC TIRES.

1,204,887.  Specification of Letters Patent.  Patented Nov. 14, 1916.

Application filed January 3, 1912. Serial No. 669,179.

*To all whom it may concern:*

Be it known that I, CHARLES E. LA FLEUR, a citizen of the United States, a resident of Philadelphia, county of Philadelphia, State of Pennsylvania, have invented an Improvement in Traction Devices for Pneumatic Tires, of which the following is a specification.

My invention has reference to traction devices for pneumatic tires and consists of certain improvements which are fully set out in the following specification and shown in the accompanying drawings which form a part thereof.

The object of my invention is to provide a construction of traction device for pneumatic tires having non-skidding properties and which shall also be durable and noiseless.

My invention consists of a plurality of transverse bars of combined rubber and textile fabric adapted to lie across the tread of the wheel, said bars being preferably round in cross section so as to at all times present a uniform surface for wear and provided on their ends with metallic or other parts which, on each side of the tire, are connected by light chains or cables for holding the bars in position upon the tire.

My invention also comprehends details of construction which, together with the features above specified, will be better understood by reference to the drawings, in which:—

Figure 1 is a side elevation of a wheel having my invention applied thereto; Fig. 2 is a cross section of same on line $x$—$x$ on a larger scale but with the ferrules in elevation; Fig. 3 is an elevation of one of the traction bars; Fig. 4 is a longitudinal section at one end of the same on line $z$—$z$; Fig. 5 is a cross section of the same on line $y$—$y$; Figs. 6 and 7 are elevations showing the manner of connecting the ends of the chains; Fig. 8 is a perspective view of a modified means for connecting the ends of the chains; Fig. 9 is an elevation of a portion of a wheel and with a modified form of my invention applied thereto; and Fig. 10 is a sectional elevation showing the manner of forming the swivel connection in the construction shown in Fig. 9.

2 are a plurality of transverse traction bars having their ends provided with tension swivels and connected on each side of the tire A by chains 4, said chains being capable of being put under tension by having their ends drawn together and engaged. In this way the traction bars 2 are held transversely across and bent over the tread of the tire.

The traction bars are made of combined rubber and textile fabric in which the rubber treated fabric is preferably rolled upon itself to form a core 6 and the core wrapped with a rubber web 7 and the bar thus formed vulcanized. The bar is preferably circular in cross section, as will be readily seen from Figs. 4 and 5, but it may be of other cross section.

I have shown the tension chains 4 of ordinary commercial construction, the links thereof being of steel wire. The ends are engaged in any suitable manner, but that shown in Figs. 6 and 7 being preferred. In this construction, the link at one end is cut across and the free ends 5 are bent in a diverging manner so as to be wider than the transverse width of the opening in the links. The ends 5 are inserted lengthwise of the link (Figs. 6 and 7) and then turned transversely as indicated in dotted lines. The tension will prevent the engaging links becoming turned and hence they cannot become accidentally disengaged. In place of making the links to engage themselves, a snap hook 16$^a$, Fig. 8, may be secured to one end of the tension chain 4 and engage the other end. In fact, any other suitable means for uniting the ends of the tension chains 4 may be employed, if so desired, as I do not restrict myself in this respect.

The tension swivels 3 may be made in any suitable manner, the object being to provide caps for the ends of the transverse traction bars 2 which by the chains 4, will draw the ends of the said bars at each side of the tire toward the center of the wheel (Figs. 1 and 2) and yet will allow the bars to rotate. By the bars having capacity for rotation, two functions are accomplished, namely, new surfaces of the bars are constantly presented to wear and the bars are continually shifting themselves upon the tire so that no injury is done to the same by constant wear on the same spots. Furthermore, the bars being of rubber and fabric, of the same general nature as the tire itself, will not have much tendency to tear or abrade the tire surface, a defect which is inherent in metal traction devices heretofore in use.

The swivel devices shown in Figs. 1, 2, 3 and 4 consist of caps or ferrules 8 of ductile metal, which are placed upon the ends of the bars 2 and retained thereon by pressing them inward annularly as at 9, said caps being provided with heads 10 and annular grooves 11 in which the links of the chains 4 are placed (Fig. 2). In practice, certain links are opened and the heads 10 placed through and then the links flattened at 19 to fit into the annular groove 11, this being an inexpensive and at the same time, an efficient construction. In this way the caps 8 are connected to the chains and are free to rotate for the purpose set out above. The swivel construction thus formed permits the bars to rotate freely.

While I have shown the attachment of the caps or heads upon the ends of the rubber bars by annularly compressing the metal of the cap or head, upon the rubber, I do not limit myself in this regard as the attachment may be made in any other suitable manner.

In Figs. 9 and 10, I have shown a simple form of swivel connection for the bars 2 when used with cables, the same consisting of the cup-shaped head or cap 2 to which is pivoted a bar 13 having holes 14 through which the cable 15 is threaded, the ends of the cable being drawn together by a strap and buckle 16, or otherwise. These bars 13 may be connected by the chains of Fig. 1 if so desired, in place of the cables, as I do not confine myself to any particular connection between the bars spacing and holding them to the tire, though I prefer the connection to be one which will permit of free rotation of said bars.

While I have preference for the vulcanized cylindrical bars with fiber cores, my invention includes the employment of any rubber fabric or flexible bar. It will be understood that my improved traction and non-skidding device is a noiseless one because of the employment of the rubber bars, has great durability and is especially effective against skidding. Moreover, it is light in weight, the bars are nonrustable, and the device is easily applied.

While I have shown my invention in the form which I have found excellently adapted for commercial practice, I do not restrict myself to the details of construction as these may be modified in various ways without departing from the spirit of the invention.

Having now described my invention, what I claim as new and desire to secure by Letters Patent, is:—

1. A transverse bar for non-skidding traction devices, consisting of a cylindrical strand of rubber having a reinforcing fabric core and normally held straight under its elasticity, combined with caps upon each end rigidly secured thereon by having annular portions circumferentially pressed into the strand whereby it is clamped thereto, said caps each provided with a solid integral head and a deep annular groove between the head and cap forming a bearing upon which the strand is journaled and whereby it may freely rotate.

2. In a non-skidding traction device for automobile wheels, transverse members of continuous rubber and fabric material adapted to normally assume a straight condition under their own elasticity, combined with circular retaining members, and means for connecting the ends of the transverse members with the circular retaining members at the sides of the wheel, consisting of caps frictionally clamped upon the ends of the transverse members and each having an integral head and a circumferential groove between the head and the cap to provide a journal, and metallic parts received in the grooves of the caps and in which the latter are journaled for free rotation, said metallic parts forming integral portions of the circular retaining members and each in direct alinement with the adjacent parts of said retaining members.

3. In a non-skidding traction device for automobiles, a plurality of transverse strands composed of rubber and fabric circular in cross section and normally straight under their elasticity, said strands adapted to be bent over the tire with constant tendency for the free ends to spring away from the tire, combined with separate flexible means for connecting the adjacent ends of the plurality of strands for drawing them down upon opposite sides of the tire, and connections between the ends of the strands and the separate flexible means providing freely rotatable unions axially arranged with respect to the strands whereby the strands may freely rotate and their elasticity acting upon the separate flexible means tending to prevent abnormal looseness and binding at the rotatable connections.

In testimony of which invention, I hereunto set my hand.

CHARLES E. LA FLEUR.

Witnesses:
R. M. HUNTER,
R. M. KELLY.